(12) United States Patent
Cocks et al.

(10) Patent No.: US 12,391,356 B2
(45) Date of Patent: Aug. 19, 2025

(54) AIRSHIPS AND RELATED METHODS

(71) Applicants: James Cocks, Salt Lake City, UT (US); Maro Sciacchitano, Portland, OR (US)

(72) Inventors: James Cocks, Salt Lake City, UT (US); Maro Sciacchitano, Portland, OR (US)

( * ) Notice: Subject to any disclaimer, the term of this patent is extended or adjusted under 35 U.S.C. 154(b) by 0 days.

(21) Appl. No.: 18/487,854

(22) Filed: Oct. 16, 2023

(65) Prior Publication Data
US 2024/0124116 A1 Apr. 18, 2024

Related U.S. Application Data

(60) Provisional application No. 63/379,874, filed on Oct. 17, 2022.

(51) Int. Cl.
*B64B 1/08* (2006.01)
*B64B 1/62* (2006.01)

(52) U.S. Cl.
CPC . *B64B 1/08* (2013.01); *B64B 1/62* (2013.01)

(58) Field of Classification Search
CPC .... B64B 1/08; B64B 1/14; B64B 1/24; B64B 1/62
See application file for complete search history.

(56) References Cited

U.S. PATENT DOCUMENTS

| 4,113,206 | A | * | 9/1978 | Wheeler | B64B 1/08 52/63 |
|---|---|---|---|---|---|
| 5,003,186 | A | | 3/1991 | Chang et al. | |
| 5,645,248 | A | | 7/1997 | Campbell | |
| 6,189,829 | B1 | | 2/2001 | Brotz | |
| 7,055,777 | B2 | | 6/2006 | Colting | |
| 9,004,397 | B2 | | 4/2015 | Pecnik | |
| 9,033,274 | B2 | | 5/2015 | Devaul et al. | |
| 9,139,279 | B2 | | 9/2015 | Heppe | |
| 9,828,081 | B1 | | 11/2017 | Devaul et al. | |
| 10,351,223 | B2 | | 7/2019 | Matthews et al. | |

(Continued)

FOREIGN PATENT DOCUMENTS

EP 2897860 B1 7/2017
GB 2059694 B 6/1983

OTHER PUBLICATIONS

Walker, Christopher K., "10 meter Sub-Orbital Large Balloon Reflector LBR Step 1 Phase B Report," University of Arizona, (May 31, 2014), 85 pages.

(Continued)

*Primary Examiner* — Nicholas McFall
(74) *Attorney, Agent, or Firm* — TraskBritt

(57) ABSTRACT

An airship may include a plurality of struts and a plurality of hubs joined to form a geodesic frame. A material may at least substantially enclose the frame. The material may be configured to contain a gas within a volume enclosed by the material, and may also be configured to absorb solar radiation for heating the gas. The airship may include a vent configured to selectively open and close to regulate one or more of a temperature and a pressure of the gas. When the vent is open, the volume enclosed by the material may be in fluid communication with an exterior of the material. When the vent is closed, the volume enclosed by the material may be at least substantially hermetically sealed from the exterior of the material. Also disclosed are methods of carrying a payload with the airship.

15 Claims, 12 Drawing Sheets

(56) References Cited

U.S. PATENT DOCUMENTS

| | | |
|---|---|---|
| 11,254,409 B2 | 2/2022 | Behroozi et al. |
| 2011/0315811 A1 | 12/2011 | Al-Garni et al. |
| 2021/0309337 A1 | 10/2021 | Little |
| 2021/0332604 A1 | 10/2021 | Aintabi |

OTHER PUBLICATIONS

Walker, Christopher, "10 meter Sub-Orbital Large Balloon Reflector (LBR)," National Aeronautics and Space Administration, (Jul. 19, 2014), 1 page.

* cited by examiner

AIRSHIPS AND RELATED METHODS

CROSS-REFERENCE TO RELATED APPLICATION

This application claims the benefit under 35 U.S.C. § 119(e) of U.S. Provisional Patent Application Ser. No. 63/379,874, filed Oct. 17, 2022, for SOLAR THERMAL AEROSTAT AND METHOD OF SHADING, the disclosure of which is incorporated herein in its entirety by this reference.

TECHNICAL FIELD

Embodiments of the present disclosure generally relate to devices and methods involving airships and, more specifically, to airships whose lift is generated using solar radiation, and to methods of making and using the same.

BACKGROUND

Aerostats are lighter-than-air aircrafts which gain lift through the use of buoyant gas—primarily helium or hydrogen, historically. One of the documented recurring problems with these types of aircraft is that the buoyant gas can leak from the aircraft, and this cannot easily be repaired or resupplied at altitude. This problem scales as the structures become larger and have increased surface area. Even at ground level, locating leaks on large aerostats becomes extremely difficult. Furthermore, helium may not be an optimal buoyant gas for use in aerostats, as it is a non-renewable and limited resource. Similarly, hydrogen may not be an optimal buoyant gas due to its corrosive properties and risk of explosion. Aerostats may also rely on specialized fuels.

BRIEF DESCRIPTION OF THE DRAWINGS

While the specification concludes with claims particularly pointing out and distinctly claiming embodiments of the present disclosure, various features and advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular airship or component thereof, but are merely idealized representations employed to describe illustrative embodiments. The drawings are not necessarily to scale.

The embodiments disclosed relate generally to airships and, more specifically, airships whose lift is generated via solar radiation.

As used herein, the terms "substantially" and "about" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% the specified value, at least about 95% the specified value, at least about 99% the specified value, or even at least about 99.9% the specified value.

Figure 1:
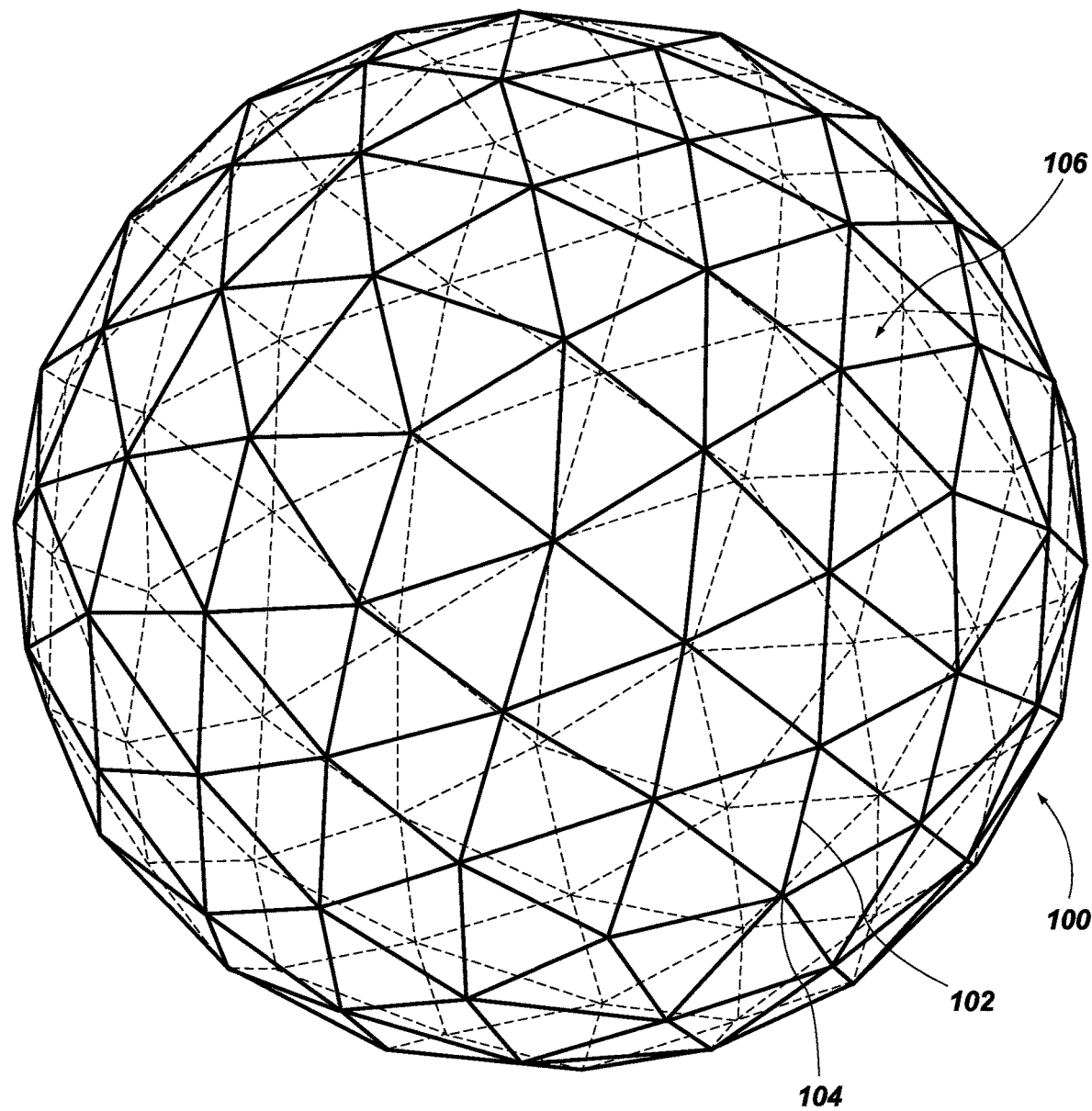
FIG. 1 is a perspective view of a geodesic polyhedron frame.

FIG. 1 illustrates an example of a generally spherical geodesic polyhedron frame which may be used as a frame for an airship. More specifically, FIG. 1 illustrates a generally spherical geodesic polyhedron frame, namely, frame 100, formed from a plurality of struts, e.g., strut 102, and a plurality of hubs, e.g., hub 104. The plurality of struts connects to the plurality of corresponding hubs to form a basic geometric (e.g., triangular) pattern which tessellates or repeats itself as the geodesic structure is built. Although frame 100 is shown to be a generally spherical geodesic polyhedron frame, it will be appreciated that in other embodiments, frame 100 may not be generally spherical in shape. For example, frame 100 may be a prolate or semi-prolate hectohexecontadihedron, a prolate or semi-prolate heptacontadihedron, any other ellipsoid-like shape (e.g., resembling a zeppelin or blimp), or any other shape that may be formable by interconnecting struts and hubs, including hubs having different numbers of and positions for arms. In still other embodiments, frame 100 may take the form of a geodetic airframe. As used herein, the terms "geodesic frame" and "geodesic polyhedron frame" may refer to any of the aforementioned shapes but are in no way limited to such shapes.

Certain embodiments of geodesic shapes, such as those that may be generally spherical, may be classified into one of three classes, namely, Class I, Class II, and Class III, according to the base geometry (i.e., the main polyhedron). Class I geodesic structures use the icosahedron as the typical base geometry, Class II geodesic structures use the octahedron as the typical base geometry, and Class III structures use the tetrahedron as the typical base geometry. Geodesic structures may further be classified according to the structure's frequency, often denoted by the letter "V." The frequency of a geodesic structure indicates the number of parts or segments into which each side of the basic triangular pattern is subdivided. For example, to construct a Class I, frequency 3 (i.e., 3V) geodesic structure, the starting base geometry would be an icosahedron, and each edge within a triangulated face of the icosahedron would be divided into three equal lengths. The three equal lengths would then be connected to divide the original triangulated face into nine smaller triangles. Because each edge of the original triangulated face was divided into three parts, the structure has a frequency of 3. The higher the frequency, the more triangular faces the geodesic structure will have, and the more struts required to build the structure. A higher frequency also makes the structure a closer approximation to a sphere.

Finally, geodesic structures may be classified according to the method used to generate the structure. There are a variety of mathematical methods known to the inventors that can be used to break down a continuous or discrete surface into facets and edges. Some methods of generating a generally spherical geodesic structure result in the structure having a consistent panel shape but with variably sized panels. Other methods result in the structure having consistently sized panels but with more variation in panel shape. Still other methods reduce the number of struts required to form a geodesic structure, while also reducing the variation in strut length when compared to certain methods. Borrowing the nomenclature used in the book titled Geodesic Math and How to Use It by Hugh Kenner, this last method may be referred to as "method 3." Utilization of method 3 may be advantageous because both the number of struts and the number of differing lengths of struts may be reduced. This may result in lower material costs, easier assembly, and a lighter frame. For example, constructing a 12V structure using method 3 may involve 12 different strut lengths. Conversely, a Class II structure having the same frequency but utilizing a different method may require 32 different strut lengths, and a Class I structure having the same frequency and utilizing the same method as the Class II may require 40 different strut lengths.

In some embodiments disclosed herein, frame 100 forms a Class II, method 3, frequency 4 geodesic structure which approximates a sphere having a 32-meter diameter, a volume of approximately 17,000 m$^3$, and a surface area of approximately 3,200 m$^2$. Frame 100 may be made up of a plurality of struts 102 joined to a plurality of hubs 104. In an embodiment where frame 100 has a diameter of 32 meters, constructing frame 100 requires 360 individual struts 102.

Figure 2B:
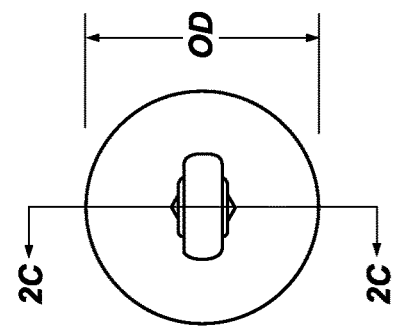
FIG. 2B is a schematic drawing of an end of the strut of FIG. 2A.
Figure 2A:
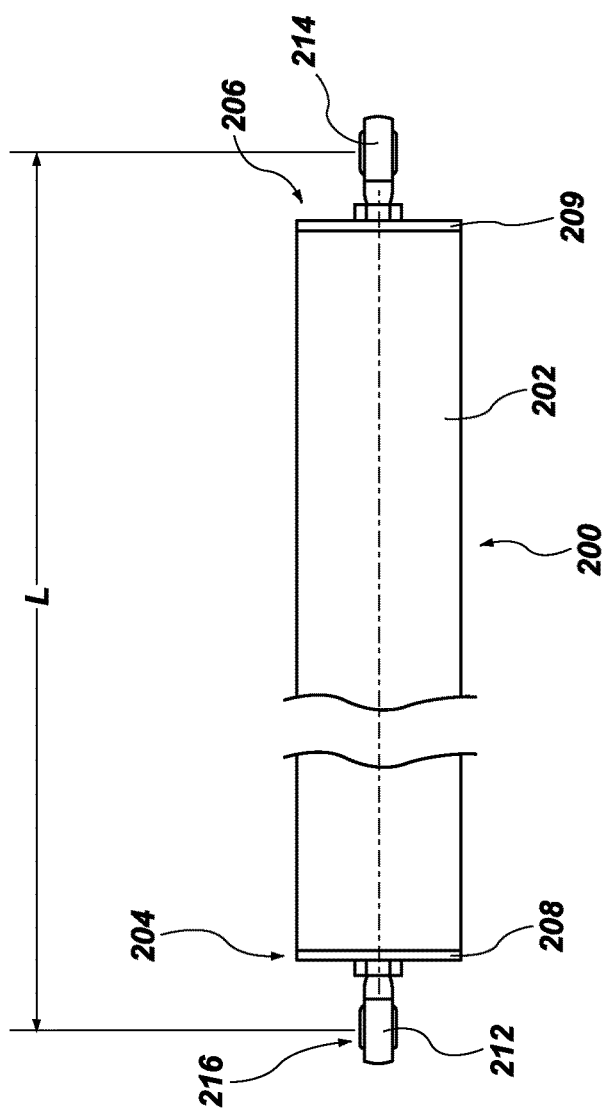
FIG. 2A is a schematic drawing of one of the struts of FIG. 1.
Figure 2C:
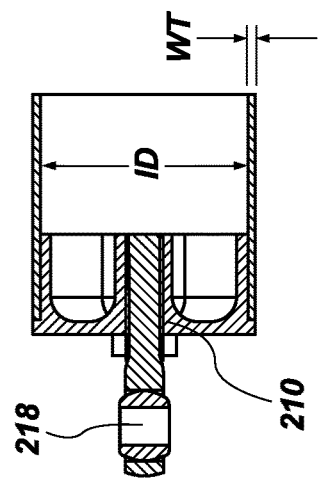
FIG. 2C is a schematic cross-sectional drawing of a portion of the strut of FIG. 2B.

FIGS. 2A-2C are schematic drawings of an illustrative strut, strut 200. Although reference will be made specifically to strut 200, it will be understood that the following description applies to each individual strut, or any number of individual struts, used to form frame 100. Strut 200 includes main body 202, cap 208, second cap 209, rod end ball joint 212, and second rod end ball joint 214. Main body 202 of strut 200 may be a tube made from a lightweight material, such as carbon fiber, though other suitable materials may be used. In one disclosed embodiment, main body 202 may have an outside diameter (OD) of 2.25 inches, an inside diameter (ID) of 2.15 inches, and a wall thickness (WT) of 0.05 inches. In other embodiments, main body 202 may have a smaller or larger OD, a smaller or larger ID, and/or a smaller or larger WT. Each of the OD, ID, and WT of main body 202 may be adjusted according to the properties of the material from which main body 202 is made and according to the desired specifications and characteristics of frame 100, including, but not limited to, the size, weight, cost, strength, rigidity, flexibility, resilience, durability, and/or payload capacity of frame 100.

Main body 202 has a first end 204 and a second end 206. Attached to first end 204 of main body 202 is cap 208. Cap 208 may be made from a lightweight, durable material, such as 7075 aluminum alloy (AA7075), however, other suitable materials may be substituted. Cap 208 is configured to be partially inserted into main body 202 at first end 204 and secured in place. In one embodiment, cap 208 may be bonded to an interior surface of main body 202 using, for example, epoxy. In other embodiments, cap 208 may be threadedly attached to main body 202 and/or secured in place to main body 202 using mechanical fasteners. In still other embodiments, cap 208 may be integrally formed with main body 202.

Centrally located within a distal surface of cap 208 is threaded hole 210. Threaded hole 210 is positioned and configured to receive a threaded portion of rod end ball joint 212. In one embodiment, a commercially available threadlocker (e.g., LOCTITE®) may be applied to the threaded portion of rod end ball joint 212 to further resist rod end ball joint 212 becoming loose or backing out over time due to, e.g., vibrations or fluctuations in temperature. A nut may additionally be used to resist rod end ball joint 212 loosening or backing out. Opposite the threaded portion of rod end ball joint 212 is articulating linkage 216. Articulating linkage 216 includes hole 218.

Second cap 209 may be similarly attached to second end 206 of main body 202 and may be identical to cap 208 in some examples. A threaded portion of second rod end ball joint 214, which may be identical to rod end ball joint 212, may be threaded into second cap 209. Second rod end ball joint 214 may also have an articulating linkage and a hole (not labeled).

The length of strut 200, denoted as L in FIG. 2A, is the distance measured from the center of hole 218 to the center of the hole in the articulating linkage in second rod end ball joint 214. In the embodiment where frame 100 has a diameter of 32 meters, the length L of strut 200 may be approximately 220 inches, or approximately 5.5 meters. Using carbon fiber rods of an appropriate length, main body 202 would weigh approximately 2.2 kg.

A plurality of struts 102 may be joined together by a plurality of hubs 104 to form frame 100. More specifically, to construct a geodesic structure following a Class II, method 3, frequency 4 structure, a plurality of two distinct kinds of hubs are required. The two distinct hubs are hub 300 and hub 400, shown in FIGS. 3 and 4, respectively. Hub 300 is a five-way or five-armed hub, meaning hub 300 is joined to five distinct struts. Hub 400 is a six-way or six-armed hub, meaning hub 400 is joined to six distinct struts. Both hub 300 and hub 400 include a body having a plurality of attachment structures (e.g., arms 302 and arms 402, respectively) extending radially outward from a geometric center of the body. Each attachment structure may define a channel (e.g., channel 301, shown in FIG. 3; channel 401 shown in FIG. 4) into which the rod end ball joints (e.g., rod end ball joint 212) may be received. Each of the attachment structures may further include holes on either side of the channel for receiving a pin, bolt, rivet, or other connector (e.g., clevis pin 304) for securing the rod end ball joint to the attachment structure. The attachment structure, in combination with the rod end ball joint, may permit the strut connected to the rod end ball joint (e.g., strut 200) to rotate about an axis of the connector (e.g., clevis pin 304). The hubs may generally resemble a five-point or six-point star. Both hub 300 and hub 400 may have a central orifice, orifice 303 and orifice 403, respectively. The material removal from the center (e.g., orifice 303) may both reduce weight and enable attachment of other structures (e.g., vents) to the hubs. Both hub 300 and hub 400 may be constructed from a strong, lightweight material, such as 7075 aluminum alloy (AA7075), though other embodiments may utilize another suitable material known in the art.

Figure 3:
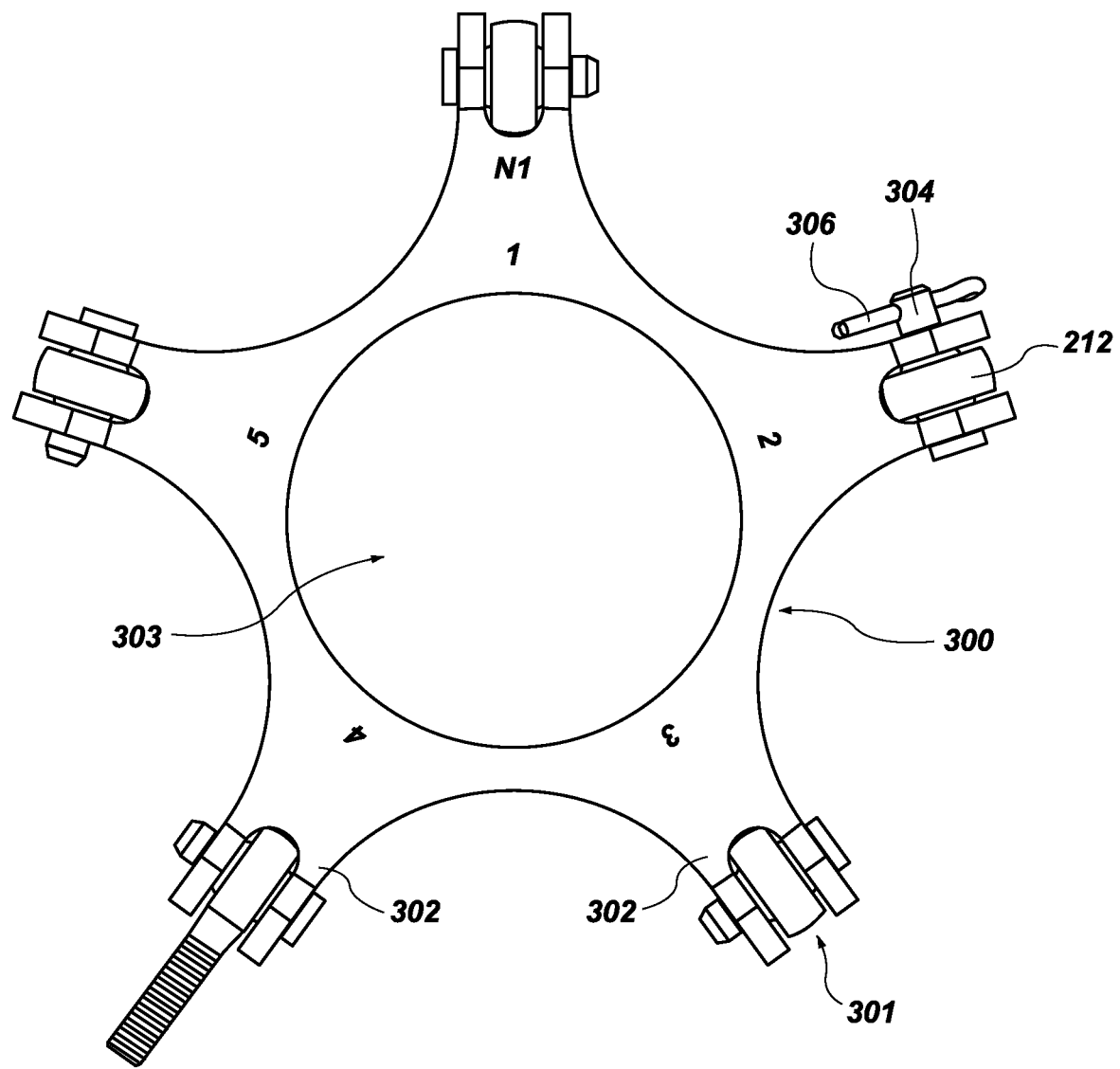
FIG. 3 is an isolated surface view of one of the hubs of FIG. 1.

FIG. 3 shows an isolated perspective view of hub 300 with five rod end ball joints (e.g., rod end ball joint 212), connected to each of hub 300's five attachment structures, namely, arms 302. Each rod end ball joint is connected to one of the arms 302 via a linkage pin, such as clevis pin 304, which extends through a first hole on a first side of a channel (e.g., channel 301), through the hole (e.g., hole 218) in the articulating linkage (e.g., articulating linkage 216) on the rod end ball joint (e.g., rod end ball joint 212), which is disposed within the channel, and out through a second hole on a second side of the channel. Clevis pin 304 may include a head, shank, and a cross-drilled hole extending through the shank. A cotter pin, such as cotter pin 306, may extend through the cross-drilled hole in the shank of clevis pin 304 to secure clevis pin 304.

As described above, connecting the rod end ball joints to the hubs in this fashion may allow the strut to which the rod end ball joint is connected the ability to rotate about an axis of the clevis pin, and may also enable the geodesic structure to be modular, easily assembled and disassembled, provide easy access to the interior portion of the structure, and facilitate easy repairs or service. Other embodiments may use other suitable methods to connect and secure the rod end ball joints to the arms of the hubs, for example, using carriage bolts and nuts.

Figure 4:
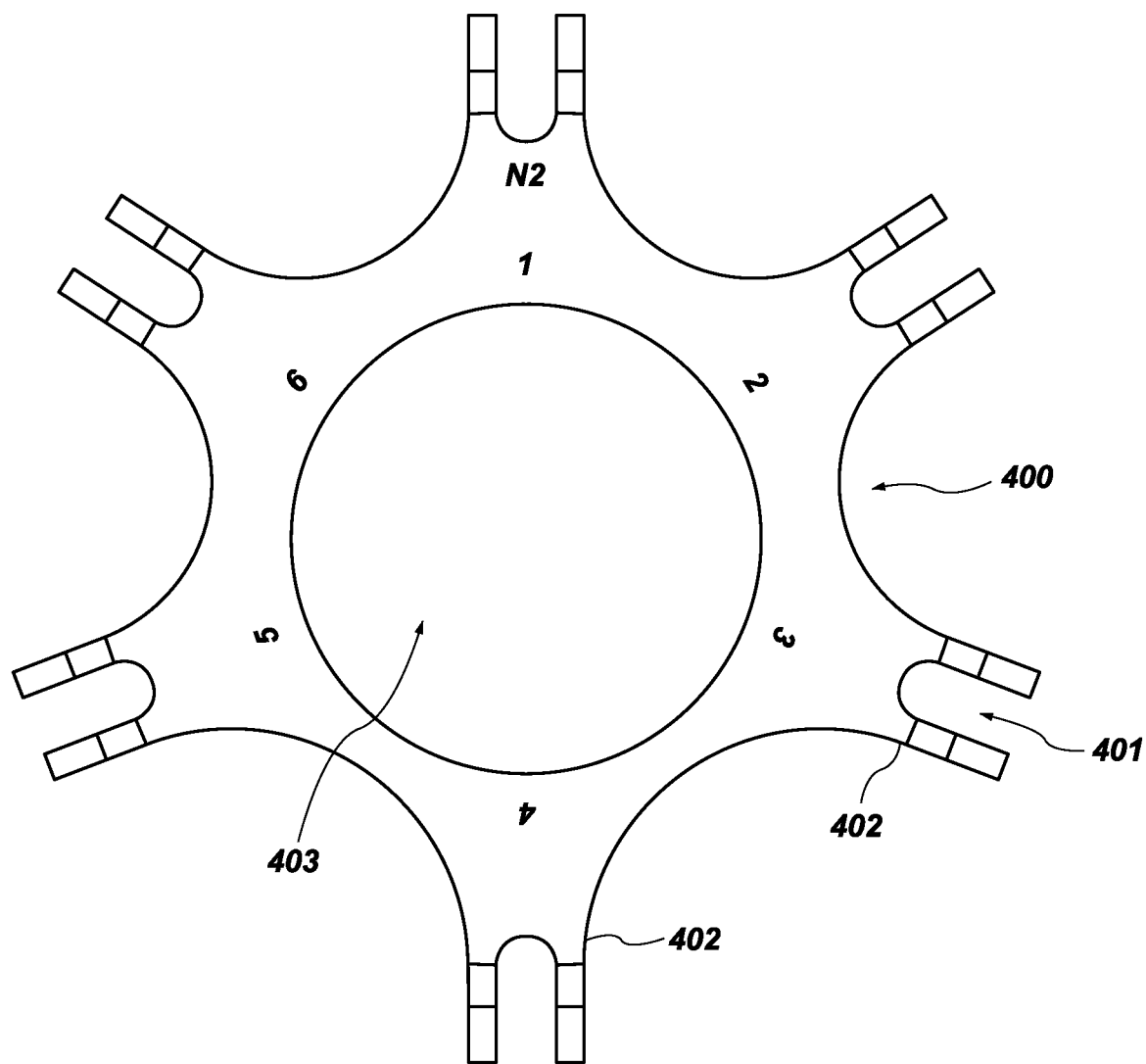
FIG. 4 is an isolated surface view of another one of the hubs of FIG. 1.

FIG. 4 shows hub 400, which is identical in purpose and similar in structure to hub 300, with one exception being that hub 400 has six arms 402 instead of five. Hub 400 is configured to connect to rod end ball joints in the same manner as hub 300, as described above.

In embodiments where frame 100 has a 32-meter diameter and follows a Class II, frequency 4 structure, 122 total hubs may be used to join the 360 total struts. Of the 122 total hubs, 12 are five-prong hubs (e.g., hub 300), with the remainder being six-prong hubs (e.g., hub 400). The total number of struts and hubs required to construct a given geodesic structure depends on the class and frequency of the geodesic structure.

Figure 5:
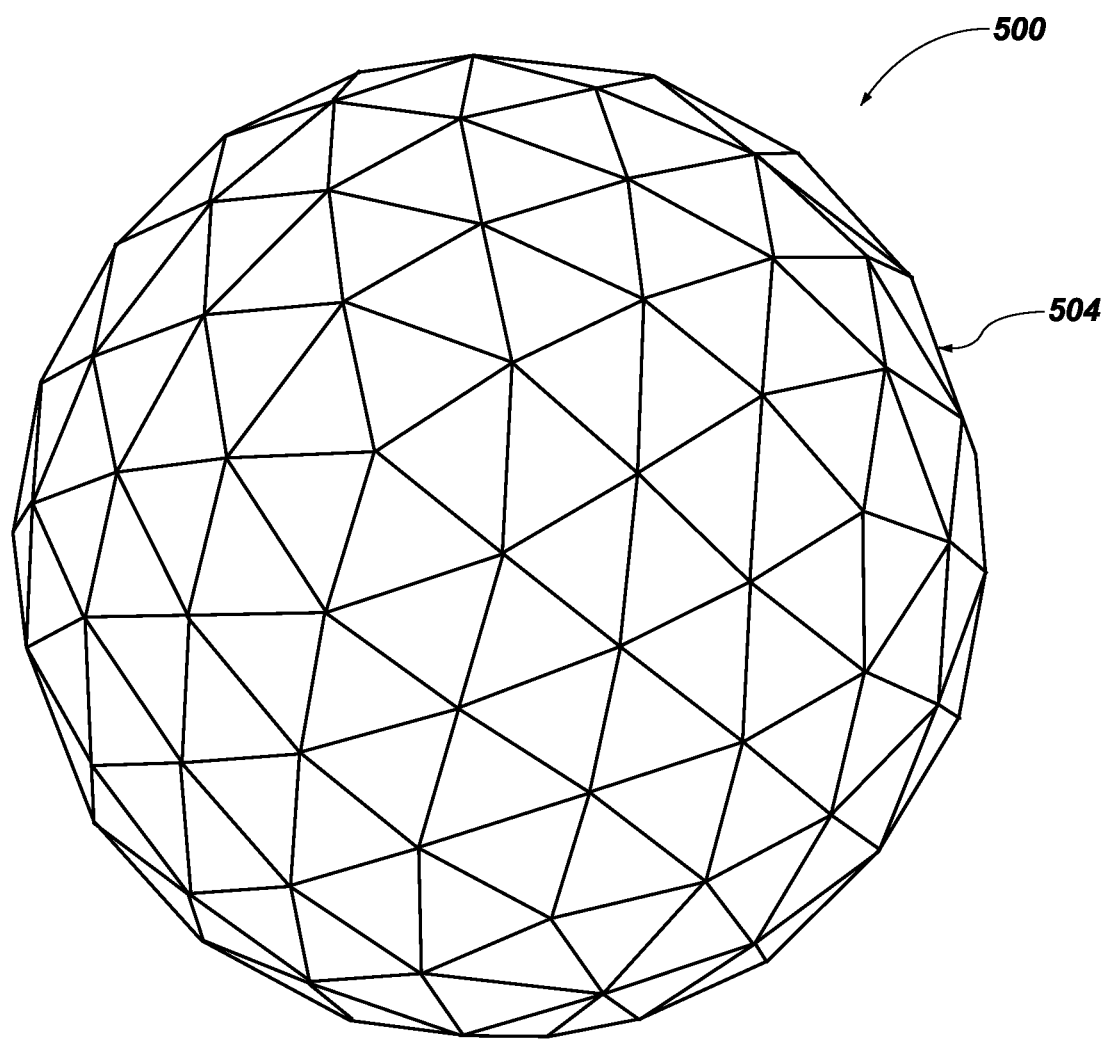
FIG. 5 is a perspective view of an enclosed geodesic polyhedron frame.

FIG. 5 is an illustration of a solar airship 500 having a geodesic polyhedron frame (located within the lightweight material 504) at least substantially enclosed by a lightweight material 504. Lightweight material 504 may be configured to be air-tight and able to contain a gas within the volume enclosed by lightweight material 504 (e.g., internal volume 106, shown in FIG. 1; internal volume 1012, shown in FIG. 10). In some embodiments, the gas within the volume enclosed by lightweight material 504 may be a gas with a density equal to or greater than a density of air at equal temperature and equal pressure, for example, ordinary air from the ambient atmosphere. In other embodiments, the gas within the volume enclosed by lightweight material 504 may be a lighter-than-air gas or a gas having a density equal to a density of air at equal temperature and equal pressure (e.g., air itself). As used herein, the term "lighter-than-air gas" may refer to a gas which has a density less than a density of air at equal temperature and equal pressure. The term lighter-than-air gas may refer to, for example, hydrogen, helium, or nitrogen, though it will be understood that the term is not limited to these examples. In still other embodiments, the gas within the volume enclosed by lightweight material 504 may not be a lighter-than-air gas.

Lightweight material 504 may be configured to at least substantially hermetically seal the volume which it encloses (e.g., internal volume 106) from the surrounding atmosphere. In other words, an interior surface of lightweight material 504 may be at least substantially hermetically sealed from an exterior surface of lightweight material 504. In some examples, lightweight material 504 may be made from a durable material which is resistant to UV damage to lengthen service life.

In one embodiment, lightweight material 504 may be a consistent material over the entire surface area of the geodesic polyhedron frame 100 (see FIG. 1; covered by lightweight material 504 in FIG. 5). For example, lightweight material 504 may be made from UV stabilized 30 Denier Polyamide 6.6. In another embodiment, lightweight material 504 may include a variety of different materials. In still other embodiments, lightweight material 504 may take the form of discrete modular panel sections removably attached to corresponding struts and/or hubs of geodesic polyhedron frame 100 (see FIG. 1).

Lightweight material 504 may be configured to absorb solar radiation to warm or heat the gas within the volume enclosed by lightweight material 504 (e.g., internal volume 106). In one embodiment, lightweight material 504 may be configured to reflect at least some solar radiation. In another embodiment, some portion of lightweight material 504 may be configured to absorb solar radiation while another portion of lightweight material 504 may be configured to reflect at least some solar radiation. In some embodiments, lightweight material 504 may be configured to at least partially polarize the incident solar radiation, and in some such embodiments, lightweight material 504 (or another material or structure), may be configured and positioned to contain at least some of the polarized solar radiation within the enclosed volume.

Heat is collected on materials with especially light absorbent surfaces. This heat can be transferred via conduction, convention, and/or radiative heat transfer through minute holes in the surface, or as the air passes over the hot surface of a boundary layer (e.g., lightweight material 504). This process can be further enhanced by modifying the texture of the solar radiation collection surfaces so that turbulent flow is induced, which may produce higher levels of heat transport and mixing compared to a forced laminar flow or natural convection with a low Raleigh number. In some embodiments, lightweight material 504 may have a variety of colors, patterns, and/or textures on one or more of an interior surface and/or an exterior surface. The different colors, patterns, and/or textures may be selected to modify lightweight material 504's ability to absorb and/or reflect solar radiation. Other embodiments of solar airship 500 may further include additional components to accelerate the warming process of the gas within the enclosed volume, such as, for example, heaters, reflective mirrors, and/or thermal heat batteries.

Solar airships within the scope of this disclosure may include a vent or valve configured to selectively open or close, wherein when the vent or valve is open, the volume enclosed by lightweight material 504 may be in fluid communication with an exterior of lightweight material 504, and when the vent or valve is closed, the volume enclosed by lightweight material 504 may be at least substantially hermetically sealed from the exterior of lightweight material 504. A temperature, a pressure, or a temperature and a pressure of a gas within the internal volume may be regulated by selectively opening or closing the vent or valve.

Figure 6:
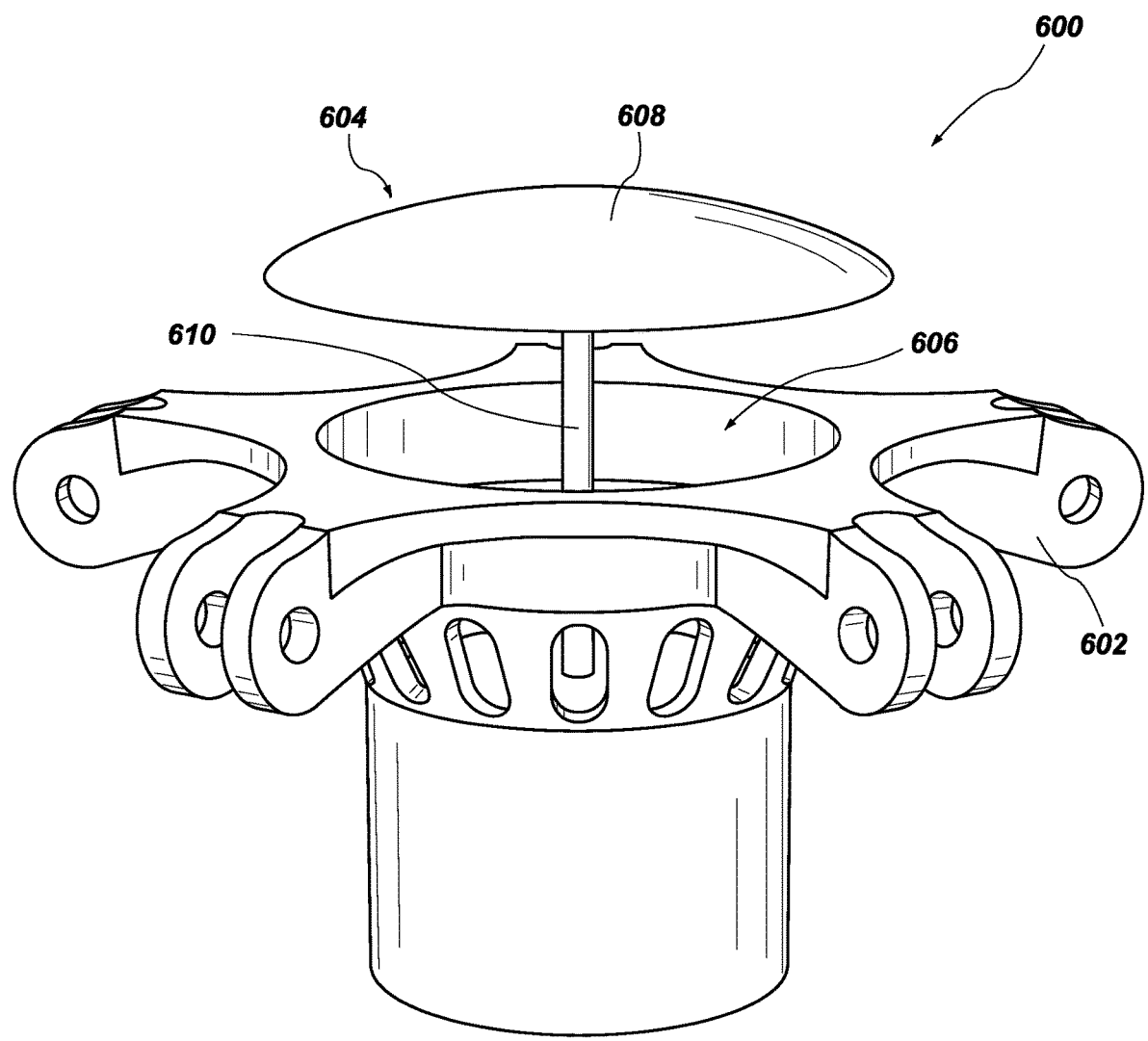
FIG. 6 is an isolated perspective view of a vent integrated into one of the plurality of hubs of FIG. 1.

More specifically, solar airship 500 may include one or more vents integrated into one or more of the hubs (e.g., hub 300) used to construct frame 100 (see FIG. 1) in some examples. FIG. 6 shows an isolated view of one such vent assembly, poppet valve assembly 600, in an open configuration. Poppet valve assembly 600 includes poppet valve 604 mounted to hub 602 such that a portion of poppet valve 604 projects through orifice 606 of hub 602. Poppet valve 604 may be mounted to hub 602 using any conventional methods known in the art, such as by welding, a snap, friction, or interference fit, or by using fasteners or adhesives. In some embodiments, poppet valve 604 may be integrally formed with hub 602. Poppet valve 604 includes seal 608 positioned on an end of valve stem 610. Seal 608 and valve stem 610 are configured to selectively move in a direction perpendicular to the plane of orifice 606 to selectively open and close poppet valve 604.

When poppet valve 604 is in an open configuration, as shown in FIG. 6, gas may be permitted to flow or may be urged from a first side of the plane of orifice 606 to a second side of the plane of orifice 606. In other words, when in an open position, poppet valve 604 may permit a gas within a volume at least substantially enclosed by a material (e.g., lightweight material 504) to be in fluid communication with an exterior of the material. Conversely, when poppet valve 604 is in a closed configuration, gas may not be permitted to flow or may not be urged from a first side of the plane of orifice 606 to a second side of the plane of orifice 606. In other words, when in a closed position, poppet valve 604 may at least substantially hermetically seal a volume at least substantially enclosed by a material (e.g., lightweight material 504) from an exterior of the material.

In some embodiments, poppet valve assembly 600 may be oriented so that when poppet valve 604 moves from a closed position to an open position, seal 608 moves in a direction away from the center of a generally spherical geodesic polyhedron structure. In this embodiment, poppet valve 604 may further include a bias element, such as a spring or elastic polymer, or other suitable means, such as a motor, configured to apply an inward force (i.e., towards the center of a generally spherical geodesic polyhedron structure) to urge poppet valve 604 into a closed position. By orienting poppet valve assembly 600 in this way, the inward force of the bias element or other suitable means, in combination with the inward force exerted on seal 608 by the surrounding atmospheric pressure, combine to keep poppet valve 604 in a closed position until an outward force (i.e., away from the center of a generally spherical geodesic polyhedron structure) exerted on seal 608 by the gas within the volume enclosed by a material (e.g., lightweight material 504) is sufficient to overcome the combined inward forces. The outward force exerted by the gas may be from a pressure of the gas as the gas is warmed.

In another embodiment, poppet valve assembly 600 may be oriented so that when poppet valve 604 moves from a closed position to an open position, seal 608 moves in a direction towards the center of a generally spherical geodesic polyhedron structure. In this embodiment, poppet valve 604 may further include a bias element, such as a spring, configured to apply an outward force (i.e., away from the center of a generally spherical geodesic polyhedron structure) to urge poppet valve 604 into a closed position. Of course, any other suitable means, such as a motor, may be incorporated to apply an outward force.

Some embodiments of the disclosed solar airship may further include at least one poppet valve assembly 600 oriented such that when poppet valve 604 moves from a closed position to an open position, seal 608 moves in a direction away from the center of a generally spherical geodesic polyhedron structure, and at least one poppet valve assembly 600 oriented such that when poppet valve 604 moves from a closed position to an open position, seal 608 moves in a direction towards the center of a generally spherical geodesic polyhedron structure.

Figure 7:
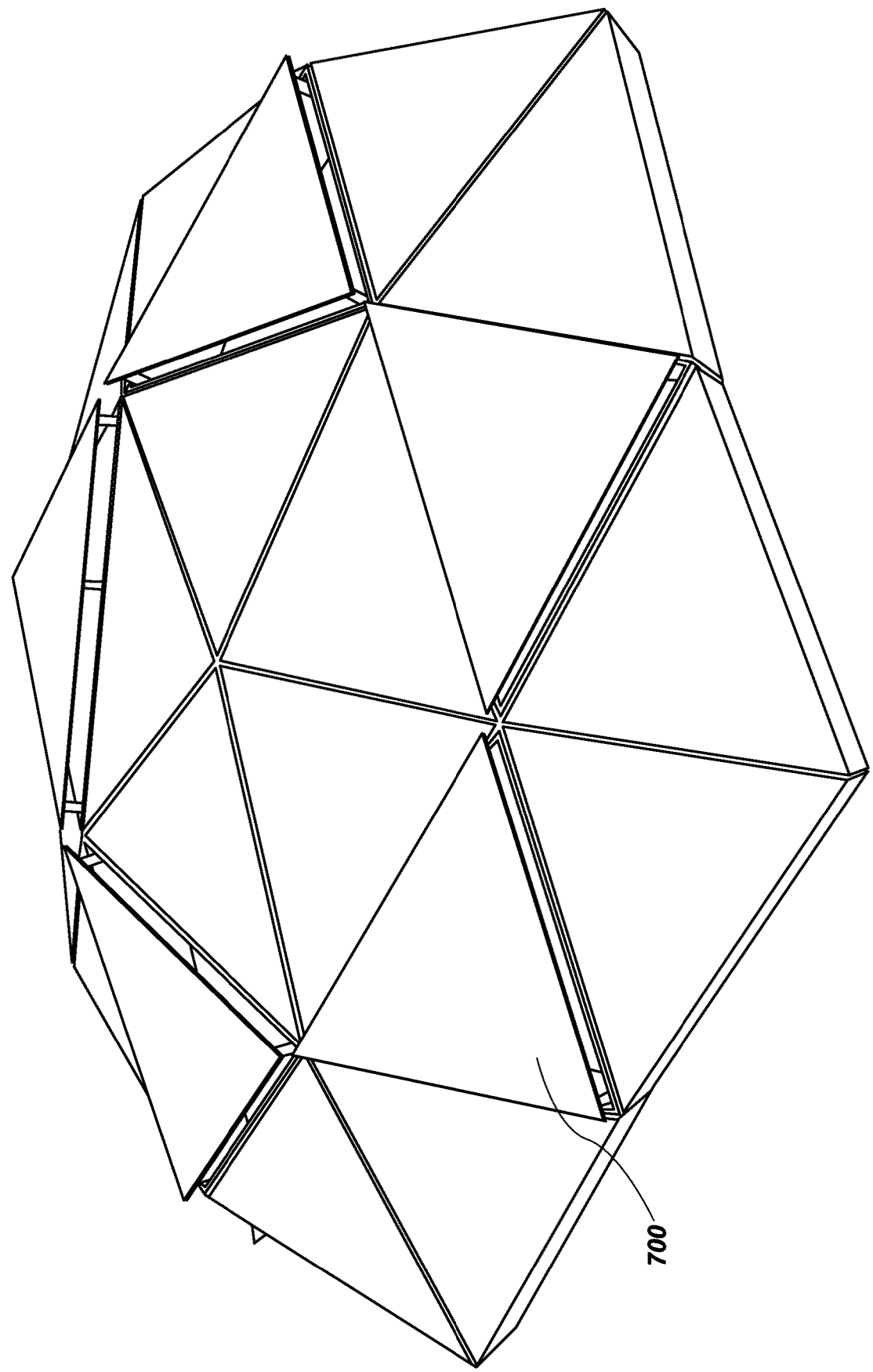
FIG. 7 is a perspective view of a portion of the enclosed geodesic polyhedron frame of FIG. 5 depicting vents.

FIG. 7 illustrates another embodiment of a vent or valve configured to selectively open and close, wherein when the vent or valve is open, a volume enclosed by a material (e.g., lightweight material 504) may be in fluid communication with an exterior of the material, and when the vent or valve is closed, the volume enclosed by the material may be at least substantially hermetically sealed from the exterior of the material 504. In particular, FIG. 7 depicts a portion of a generally spherical geodesic polyhedron frame (e.g., frame 100) at least substantially covered by a material (e.g., lightweight material 504), and further depicts at least one vent configured to selectively open and close. More specifically, the at least one vent configured to selectively open and close includes at least one panel, such as poppet vent panel 700, attached to the geodesic polyhedron frame, wherein the at least one panel is configured to selectively translate in a radial direction (i.e., towards and/or away from the center of the generally spherical geodesic polyhedron frame). Poppet vent panel 700 may be mounted to the geodesic polyhedron frame via poppet valve assembly 600, for example.

Figure 8:
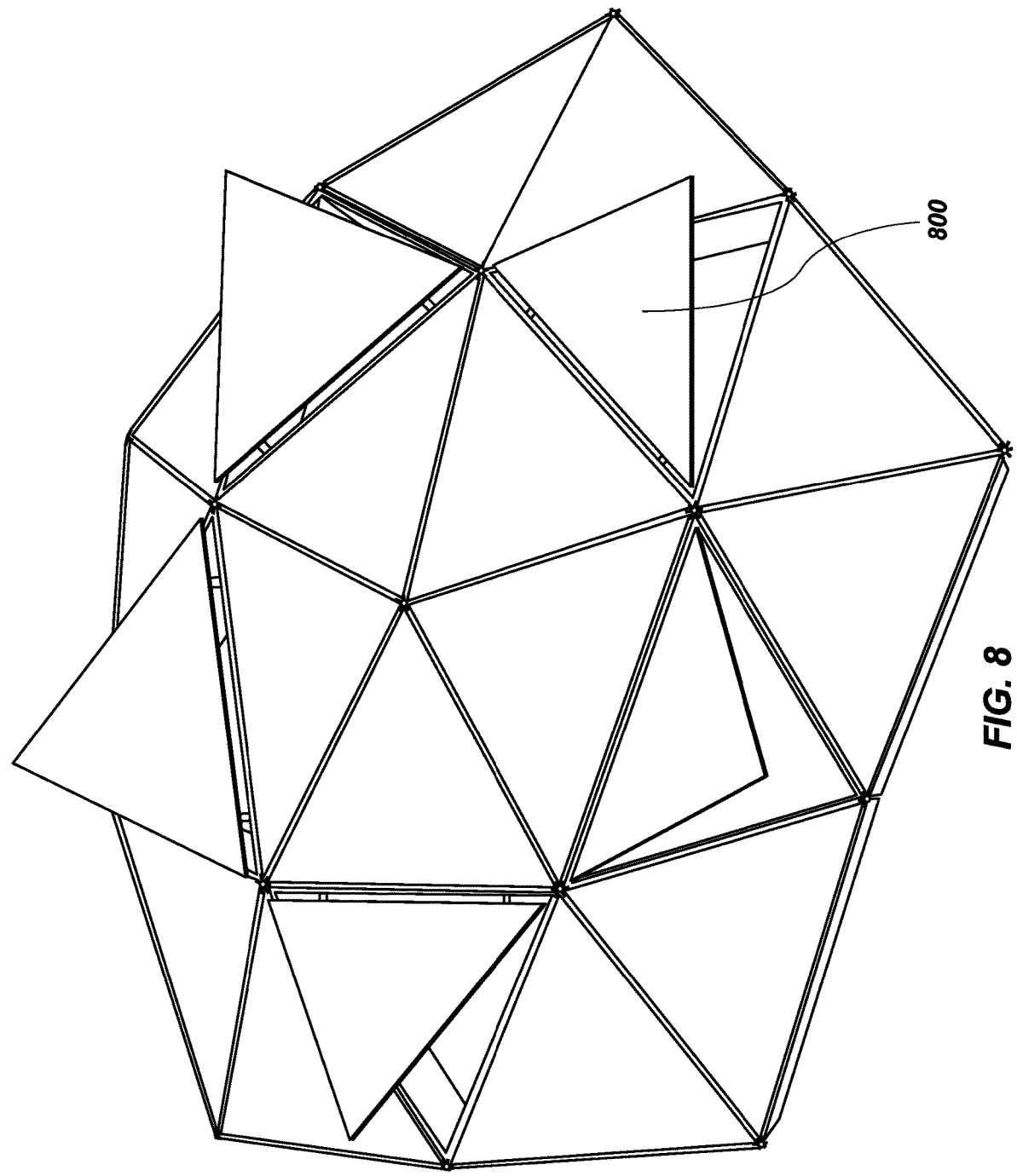
FIG. 8 is a perspective view of a portion of the enclosed geodesic polyhedron frame of FIG. 5 depicting other embodiments of vents.

FIG. 8 illustrates another embodiment of a vent or valve configured to selectively open and close, wherein when the vent or valve is open, a volume enclosed by a material (e.g., lightweight material 504) may be in fluid communication with an exterior of the material, and when the vent or valve is closed, the volume enclosed by the material may be at least substantially hermetically sealed from the exterior of the material. Similar to FIG. 7, FIG. 8 depicts a portion of a generally spherical geodesic polyhedron frame (e.g., frame 100) at least substantially covered by a material (e.g., lightweight material 504), and further depicts at least one vent configured to selectively open and close. More specifically, the at least one vent configured to selectively open and close includes at least one panel, such as louver vent panel 800, attached to the geodesic polyhedron frame, wherein the at least one panel is configured to selectively translate angularly about at least one corresponding strut (e.g., strut 102) used to form the geodesic polyhedron frame.

Other embodiments of the disclosed solar airship may include vents or valves disposed on a face of one or more panels attached to the geodesic polyhedron frame. For example, a panel attached to the geodesic polyhedron frame may include selectively rotatable louvers for permitting fluid communication between an exterior of a material at least substantially covering the geodesic polyhedron frame and an interior volume enclosed by the material, for example, louvers 1200 shown in FIG. 12.

Figure 9:
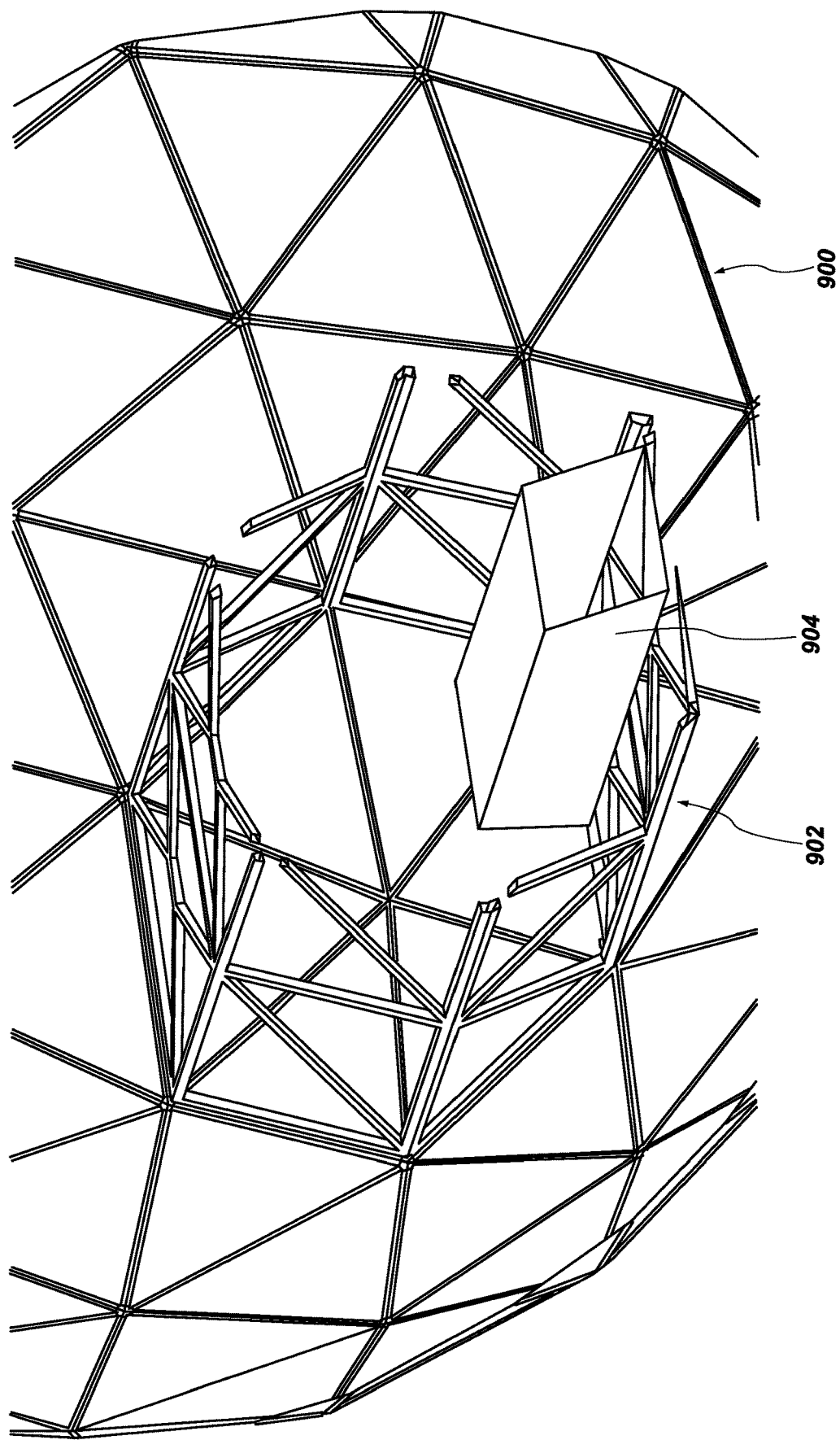
FIG. 9 is a cross-sectional view of an enclosed geodesic polyhedron frame.

FIG. 9 shows a portion of a cross sectional view of a geodesic polyhedron frame, frame 900, with an internal payload support structure 902 supported from frame 900, the internal payload support structure 902 supporting a payload 904. Internal payload support structure 902 may be directly supported from frame 900, as shown in FIG. 9, or may be indirectly attached to frame 900 through, for example, suspension cables. Internal payload support structure 902 may be made from any suitable rigid, lightweight, and durable material capable, and may be supported from frame 900 using fasteners, clamps, or any other suitable method known in the art.

Figure 10:
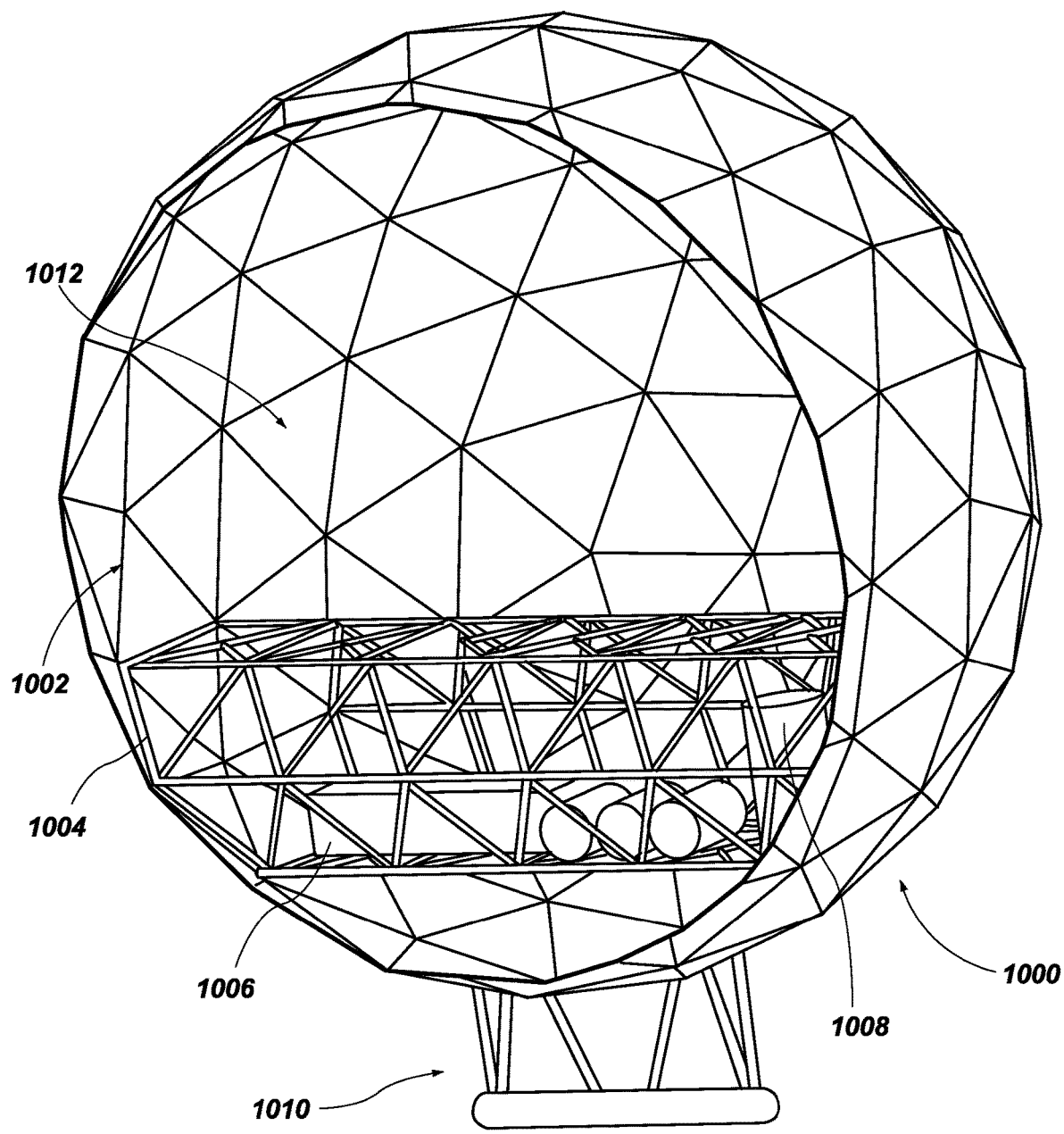
FIG. 10 is a partial cross-sectional perspective view of a geodesic polyhedron frame with a payload support structure.

FIG. 10 shows a cross sectional view of a solar airship 1000 having a geodesic polyhedron frame, frame 1002, and a volume at least substantially enclosed by a material, namely, internal volume 1012. Internal payload support structure 1004 may be entirely disposed within internal volume 1012 and supported from frame 1002 using fasteners, clamps, or any other suitable method known in the art. Internal payload support structure 1004 may be made from a rigid, lightweight, and durable material capable of bearing a payload, such as payload 1006. An air tank coupled to a compressor, such as air tank and compressor 1008, may additionally be supported from frame 1002 by way of internal payload support structure 1004. In other embodiments, payload 1006 and/or air tank and compressor 1008 may be directly mounted to frame 1002. In some embodiments, a heat pump (e.g., heat pump 1216, shown in FIG. 12), may also be supported from frame 1002 by way of internal payload support structure 1004, and in other embodiments, the heat pump may be directly mounted to frame 1002. The heat pump may be solar powered. The heat pump may be configured to selectively warm and/or cool the gas within internal volume 1012.

As noted above, solar airship 1000 may include an air tank coupled to a compressor. The compressor may be configured to compress air into the air tank, and the air tank may be configured to receive, store, and discharge the compressed air. More specifically, the compressor may be configured to compress air from the surrounding atmosphere into the air tank to increase the total weight of solar airship 1000. In other embodiments, the compressor may be configured to compress the gas within internal volume 1012. The air tank may be configured to discharge the compressed air into the surrounding atmosphere. In other embodiments, the air tank may be configured to discharge the compressed air into internal volume 1012. The air tank and compressor may be configured for increasing the total mass of solar airship 1000 (inclusive of the mass of the gas within internal volume 1012) by compressing air drawn from the surrounding atmosphere into the air tank, or by compressing air drawn from within internal volume 1012, while a vent (e.g., poppet valve 604) is in an open configuration, into the air tank. Similarly, the air tank and compressor may be configured for decreasing the total mass of solar airship 1000 (inclusive of the mass of the gas within internal volume 1012) by discharging compressed air stored in the air tank into the surrounding atmosphere.

Solar airship 1000 also includes external payload support structure 1010. Similar to internal payload support structure 1004, external payload support structure 1010 may be supported from frame 1002 using fasteners, clamps, or any other suitable method known in the art. External payload support structure 1010 may be configured to support a payload, provide accessible attachment points, or support additional equipment, e.g., weather instruments such as thermometers, wind vanes, hygrometers, anemometers, barometers, rain gauges, lightning detectors, etc.; equipment for providing voice and/or data communications; electromagnetic radio wave emitting devices; equipment for providing cellular or internet access; infrared or photon collectors; screens for displaying information; navigation equipment; power systems; or any other equipment commonly used by stratospheric airships.

External payload support structure 1010 may be made from a lightweight and durable material. In some embodiments, external payload support structure 1010 may be made from a rigid material. In other embodiments, external payload support structure 1010 may be made from a flexible material.

The disclosed solar airship generates lift by exploiting Archimedes principle. In simple terms, a fluid (gas or liquid) exerts a buoyant force on an object equal to the weight of the fluid displaced by the object. Accordingly, if a solar airship displaces a volume of air having a weight greater than the total weight of the solar airship (including the weight of any gas enclosed therein), the buoyant force exerted on the solar airship will cause the solar airship to float.

A gas' density is inversely proportional to its temperature and directly proportional to its pressure and volume. Thus, if at least one of a temperature, pressure, or density of a gas within an enclosed volume may be regulated (e.g., regulating the pressure and/or temperature of the gas by permitting at least a portion of the gas within the enclosed volume to escape the enclosed volume while heating the gas), then the density of the gas within the enclosed volume may similarly be regulated. By decreasing the density of the gas within the enclosed volume, pressure may increase and gas may be expelled from the interior volume, causing the mass of the remaining gas within the enclosed volume to be less than the mass before any gas was expelled, effectively decreasing the total mass of the solar airship. Accordingly, as the gas within the enclosed volume is warmed and the mass of the gas within the enclosed volume decreases, the solar airship may experience a positive buoyant force (i.e., lift) if the solar airship displaces a sufficient amount of air.

In some embodiments wherein the solar airship has a diameter of 32 meters, the enclosed internal volume (e.g., internal volume 1012, shown in FIG. 10) may be approximately 16,000 $m^2$. The gas within the internal volume may be air and may not be a lighter-than-air gas. In this embodiment, the mass of this volume of air at sea level is about 22,000 kg. Heating the gas within the internal volume to be approximately 25° C. warmer than the air in the surrounding atmosphere (i.e., the air outside the internal volume) displaces about 1,600 kg of air, supposing a pressure of the gas within the internal volume is equilibrated to the pressure of the surrounding atmospheric pressure. The total mass of the solar airship (e.g., the mass of geodesic polyhedron frame 100 (see FIG. 1), plus the mass of lightweight material 504, plus the mass of the gas contained within the internal volume, plus the mass of any additional equipment attached to geodesic polyhedron frame 100 (see FIG. 1)) may be approximately 1,175 kg. Because the total mass of the solar airship may be less than the weight of the displaced volume of air, the solar airship may be positively buoyant and float in the air. Indeed, not only may the solar airship be positively buoyant but the solar airship may additionally have a payload capacity of approximately 430 kg with a maximum service ceiling of 5 km. This payload capacity may increase as the temperature differential between the gas within the internal volume and the air in the surrounding atmosphere increases beyond 25° C., supposing the pressure of the gas within the internal volume is equalized to the surrounding atmospheric pressure.

Furthermore, because the surface area to volume ratio follows the square-cube law, the payload capacity increases dramatically as the diameter of the geodesic polyhedron framework increases. For example, in another embodiment where the solar airship has a geodesic polyhedron framework with a 150-meter diameter, and where the temperature differential of the gas enclosed within the solar airship compared to the temperature of the air in the surrounding atmosphere is 40° C., the payload capacity could be approximately 10,000 kg at 60,000 feet of altitude, even when accounting for the thinner atmosphere. And a truly massive version of this structure with a 1-mile diameter could have a net payload capacity in the order of 100,000,000 kg in the lower stratosphere.

As discussed, if at least one of a temperature, a pressure, or a density of a gas within an enclosed volume may be regulated, the mass of the gas within the enclosed volume may be adjusted. In one embodiment, a solar airship may have means for variably controlling the buoyancy of the solar airship. Such means may include, but are not limited to: a material (e.g., lightweight material 504) configured for absorbing solar radiation for warming a gas within a volume at least substantially enclosed by the material; one or more vents for enabling fluid communication between an interior of an enclosed volume and an exterior of an enclosed volume for equalizing the pressure of the gas within the enclosed volume, and/or for adjusting the temperature of the gas within the enclosed volume; a solar-powered heat pump (e.g., heat pump 1216, shown in FIG. 12); or a compressor coupled to an air tank, the compressor configured to compress air into the air tank, and the air tank configured to receive, store, and discharge the compressed air. In other embodiments, the volume in which the gas is enclosed may be at least a substantially fixed volume, and in some embodiments, the volume may be at least substantially fixed and maintained by a rigid frame or structure.

Figure 11:
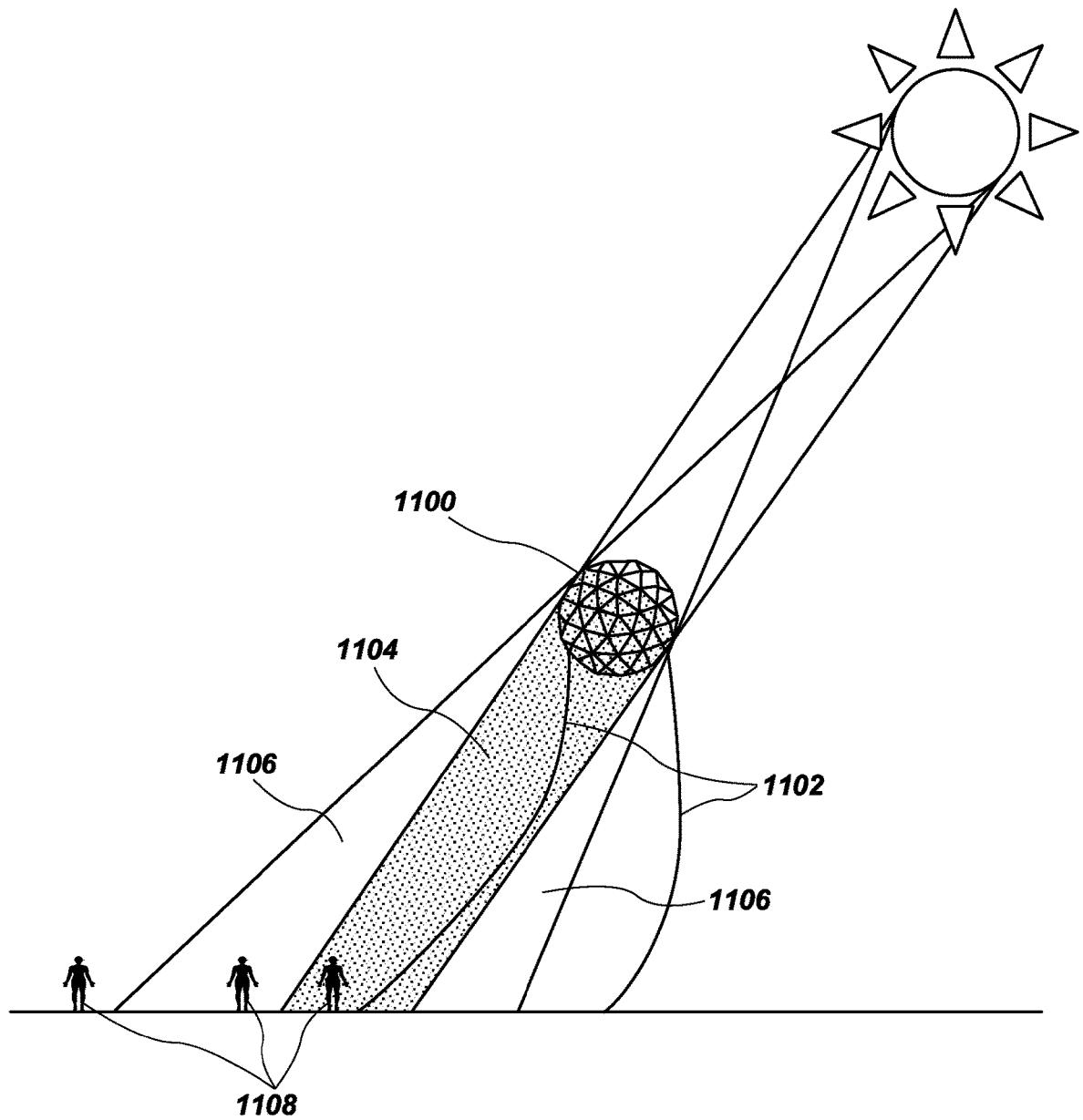
FIG. 11 is a schematic of an airship in the air and tethered to the ground.

FIG. 11 is an illustration of solar airship 1100 positioned within the atmosphere. Tethers 1102 may be configured for positioning solar airship 1100 in space. In particular, tethers 1102 may be configured for adjusting and/or maintaining the altitude of solar airship 1100, and may be configured for positioning solar airship 1100 in a desired location relative to the ground. Tethers 1102 may be configured to connect directly to the geodesic polyhedron frame of solar airship 1100, an external payload support structure supported from the geodesic polyhedron frame (e.g., external payload support structure 1010), or to a material covering solar airship 1100 (e.g., lightweight material 504).

One potential use of solar airship 1100 may be to provide shade to the areas below the solar airship 1100. Like a solar eclipse, solar airship 1100 may provide a fully shaded umbra 1104, as well as partially shaded penumbra 1106. This may be useful for providing shade for people 1108, as well as a relatively contained outdoor area, such as a stadium, outdoor concert, or outdoor mall. In an embodiment where solar airship 1100 has a diameter of 100 feet, if the center of solar airship 1100 were positioned approximately 300 feet above ground level, it may appear approximately 36 times the size of the moon from ground level. If its position were to remain static relative to the sun (which could be accomplished via tethers 1102, for example), solar airship 1100 may provide approximately 90 minutes of shade to a designated area as the sun's relative position changes. During the shaded period, the temperature of the shaded area (i.e., fully shaded umbra 1104) may lower by approximately 10° F. as compared to the surrounding unshaded area, similar to the temperature drops associated with solar eclipses. As described above, solar airship 1100 may additionally be configured with communications equipment to provide improved cellular or internet access for the areas below. Additionally, solar airship 1100 may also be configured with LED lights or other devices for displaying messages or visuals, such as the type that jumbotrons display at sporting events, or alternatively, for advertising purposes by third-party sponsors. Solar airship 1100 may also be configured with surveillance and monitoring equipment, along with various types of payloads. Such equipment can be used to monitor the effects of shading on the ground, monitor the surrounding environment, or provide useful data for navigation and operations. A tethered embodiment of solar airship 1100 may be configured to capture solar electricity and transmit it to the ground through tethers 1102. A large version of solar airship 1100, or several smaller versions of solar airship 1100, may be used to provide shade for ecologically sensitive areas, such as glaciers during summer months. Additionally, one or more of solar airship 1100 may be used to calibrate regional shading and atmospheric models for larger solar geoengineering modeling.

Figure 12:
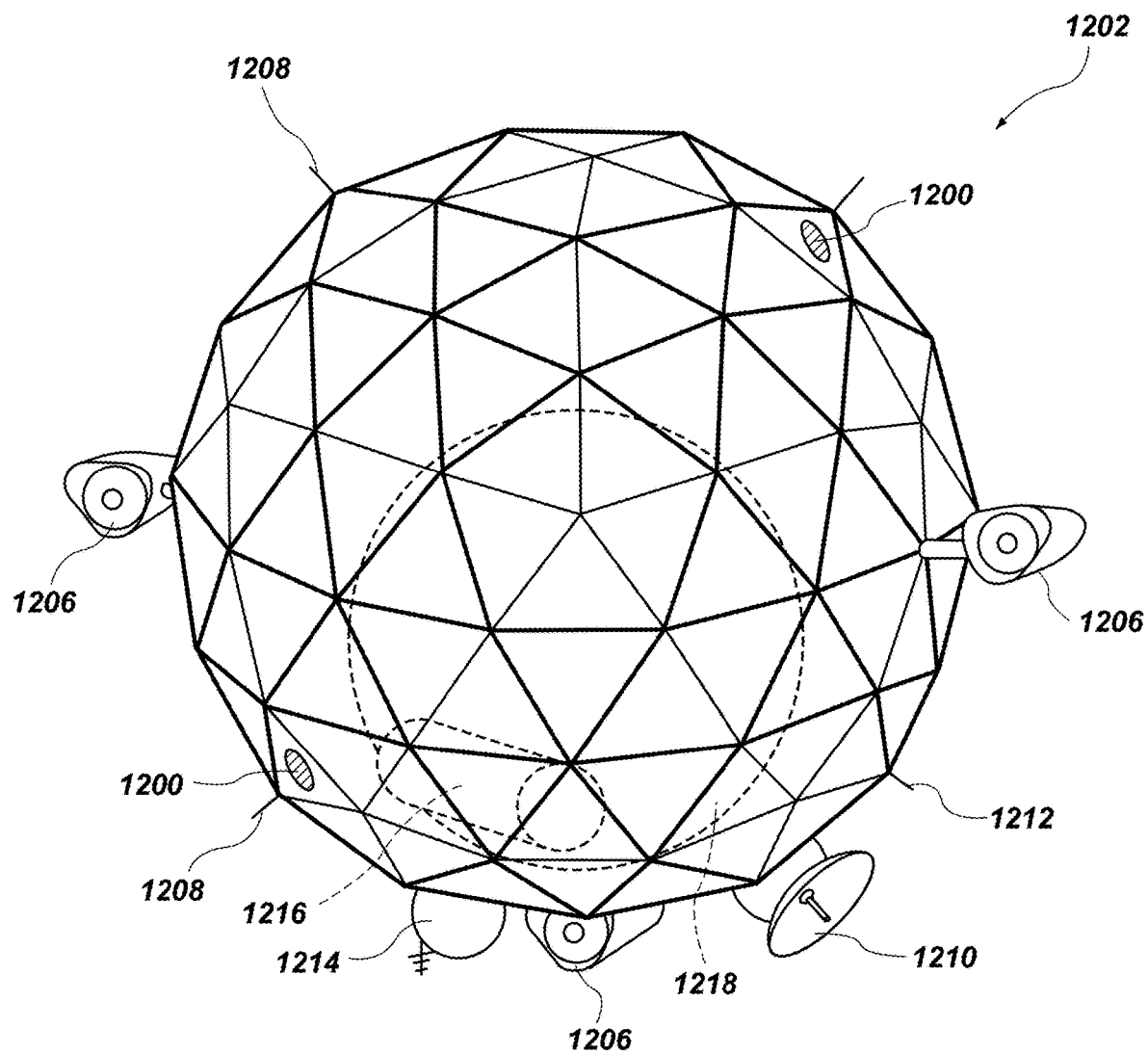
FIG. 12 is a perspective view of an airship depicting various attachments.

FIG. 12 shows solar airship 1202 with various components attached. In particular, solar airship 1202 may be configured with one or more propulsion devices 1206 for positioning solar airship 1202 within space. Solar airship 1202 may further be configured with lightning rods 1208 for protection from lightning, such as vertical lightning from clouds below. Solar airship 1202 may also be configured with communication devices 1210, infrared or photon collectors 1212, electromagnetic radio wave emitters 1214, solar powered heat pump 1216, and/or a thermal battery 1218. Solar powered heat pump 1216 may be configured to warm and/or cool the gas within an internal volume of solar airship 1202. Thermal battery 1218 may be a heat-absorbing material positioned within an internal volume of solar airship 1202 that absorbs heat during exposure to solar energy, and then radiates heat within the internal volume of solar airship 1202 to maintain a relatively stable temperature through the night.

Also disclosed herein is a method of carrying a payload with an airship. With reference to FIGS. 6 and 10, the method includes loading a payload (e.g., payload 1006) on a payload support structure (e.g., internal payload support structure 1004) attached to a geodesic polyhedron frame (e.g., frame 1002), the geodesic polyhedron frame formed by a plurality of struts mutually joined with a plurality of hubs, the geodesic polyhedron frame defining an internal volume (e.g., internal volume 1012), the internal volume at least substantially enclosed by a lightweight material configured to contain a gas within the internal volume, wherein the lightweight material is further configured to absorb solar radiation to warm the gas within the internal volume; warming the gas within the internal volume via solar radiation, the gas having a density equal to or greater than a density of air at equal temperature and equal pressure; selectively opening a valve (e.g., poppet valve 604) to allow the internal volume to be in fluid communication with an exterior of the lightweight material; and selectively closing the valve to at least substantially hermetically seal the internal volume from the exterior of the material. In some embodiments, the method of carrying a payload with an airship may further include maintaining the internal volume to be an at least substantially fixed volume. The internal volume may be at least substantially fixed by the geodesic polyhedron frame.

The method of carrying a payload may further comprise regulating a temperature, a pressure, or a temperature and a pressure of the gas within the internal volume by selectively opening or closing the valve.

The method of carrying a payload may further comprise compressing air from the ambient atmosphere into an air tank (e.g., air tank and compressor 1008) attached to the airship.

The method of carrying a payload may further comprise discharging compressed air from an air tank (e.g., air tank and compressor 1008) attached to the airship into the ambient atmosphere.

What is claimed is:
1. An airship comprising:
   a plurality of struts and a plurality of hubs joined to form a geodesic frame;

a material at least substantially enclosing the geodesic frame and configured to contain a gas within a volume enclosed by the material; and a vent configured to selectively open and close, wherein when the vent is open, the volume enclosed by the material is in fluid communication with an exterior of the material, and when the vent is closed, the volume enclosed by the material is impeded from passing to the exterior of the material;

wherein the material is configured to absorb solar radiation to heat the gas within the volume enclosed by the material;

wherein the vent is configured to selectively open or close to regulate one or more of a temperature and a pressure of the gas within the volume enclosed by the material; and wherein the vent is integrated into one of the plurality of hubs.

2. The airship of claim 1, wherein the vent comprises a poppet valve.

3. The airship of claim 1, wherein a density of the gas within the volume enclosed by the material is equal to or greater than a density of air at equal temperature and equal pressure.

4. The airship of claim 1, further comprising a payload support structure supported from the geodesic frame.

5. The airship of claim 1, further comprising a tether attached to the geodesic frame.

6. The airship of claim 1, further comprising one or more of an infrared collector, photon collector, electromagnetic radio wave emitting device, solar-powered heat pump, or other communications device supported on the geodesic frame.

7. A method of carrying a payload with an airship, the method comprising: loading a payload on a payload support structure attached to a geodesic frame, the geodesic frame formed by a plurality of struts mutually joined with a plurality of hubs, the geodesic frame defining an internal volume, the internal volume at least substantially enclosed by a material configured to contain a gas within the internal volume, wherein the material is further configured to absorb solar radiation to warm the gas within the internal volume;

warming the gas within the internal volume via solar radiation, the gas having a density equal to or greater than a density of air at equal temperature and equal pressure;

selectively opening a valve to allow the internal volume to be in fluid communication with an exterior of the material, wherein the valve is integrated into one of the plurality of hubs; and selectively closing the valve to impede the gas within the internal volume from passing to the exterior of the material.

8. The method of claim 7, further comprising regulating a temperature, a pressure, or a temperature and a pressure of the gas within the internal volume by selectively opening or closing the valve.

9. The method of claim 7, further comprising discharging compressed air from an air tank attached to the airship into the ambient atmosphere.

10. A thermal airship comprising:

a geodesic structure comprising struts mutually connected to corresponding hubs;

a material at least substantially surrounding the geodesic structure, the material configured to absorb solar radiation to heat a gas within a volume enclosed by the material, the material configured to impede passage of gas between an interior of the volume and an exterior of the volume; and means for variably controlling the buoyancy of the thermal airship;

wherein the means for variably controlling the buoyancy of the thermal airship comprise at least one vent integrated within at least one of the hubs.

11. The thermal airship of claim 10, wherein the means for variably controlling the buoyancy of the thermal airship comprise a plurality of vents.

12. The thermal airship of claim 10, wherein the at least one vent comprises at least one poppet valve.

13. The thermal airship of claim 10, wherein the material comprises modular panels removably attached to the geodesic structure.

14. The thermal airship of claim 10, further comprising a payload support structure supported from the geodesic structure.

15. The thermal airship of claim 10, further comprising means for positioning the thermal airship in space.

* * * * *